United States Patent [19]

Salowe et al.

[11] 4,371,829

[45] Feb. 1, 1983

[54] CAPACITOR UNIT WITH A DISCHARGE RESISTOR SWITCH

[75] Inventors: Seymour Salowe, Murrysville; Thomas C. Zinchuk, Level Green, both of Pa.

[73] Assignee: Westinghouse Electric Corp., Pittsburgh, Pa.

[21] Appl. No.: 321,159

[22] Filed: Nov. 13, 1981

[51] Int. Cl.³ .............................................. H02J 3/18
[52] U.S. Cl. .................................................. 323/209
[58] Field of Search ........................ 323/209; 335/153

[56] References Cited

U.S. PATENT DOCUMENTS 3,638,151  1/1972  Van der Heide .................. 335/153

FOREIGN PATENT DOCUMENTS 2528283  1/1977  Fed. Rep. of Germany ...... 323/209

Primary Examiner—William M. Shoop
Attorney, Agent, or Firm—R. P. Lenart

[57] ABSTRACT

A capacitor unit including a capacitive element connected in parallel with a discharge resistor is provided with a switch in series with the resistor. This switch responds to power frequency current flowing through the capacitive element such that it opens to remove the discharge resistor from the circuit when power frequency current is flowing through the capacitor unit and closes when power frequency current stops, thus reinserting the discharge resistor to eliminate any residual charge remaining on the capacitive element.

10 Claims, 5 Drawing Figures

CAPACITOR UNIT WITH A DISCHARGE RESISTOR SWITCH

BACKGROUND OF THE INVENTION

1. Field of the Invention

This invention relates to capacitor units for use in electrical power distribution systems. Capacitor units are used in electrical power distribution systems to improve voltage regulation and to correct circuit power factor when a lagging power factor is caused by inductive loading on the system.

2. Description of the Prior Art

When an electrical power distribution system is operated during periods of heavy load, losses in transmission lines result in decreased voltage at the load. The insertion of a shunt capacitor unit in the system near the load results in a voltage increase at that point to counteract the voltage lost in the transmission lines. Thus voltage can be regulated by inserting or removing shunt capacitor units as required by changes in system loading.

Capacitor units also serve to increase circuit efficiency when inductive loads create a lagging power factor. This is accomplished by connecting shunt capacitor units in parallel with the load to supply part of the lagging component of the current, thereby increasing the circuit power factor.

Prior to this invention, power capacitor units contained a fixed discharge resistor permanently connected in parallel with a capacitive element. This discharge resistor is required to drain the charge off of the capacitive element when the capacitor unit is disconnected from the power distribution system voltage. This provides a safety feature which minimizes the probability of an electrical shock being caused by residual charge on the capacitor when it is disconnected from the distribution system.

When the capacitor unit is connected to the power distribution system, the discharge resistor is connected across the power lines and continually consumes power during normal operation. Since the discharge resistor serves no purpose when the capacitor unit is connected to the power distribution system, any power which it consumes tends to lower the efficiency of the system.

SUMMARY OF THE INVENTION

This invention provides a means of lowering distribution system losses by removing the discharge resistor load under continuous power frequency operation. This is accomplished through the use of a switch which is in series with the discharge resistor. The switch is sensitive to power frequency current flowing in the capacitor unit and serves to disconnect the resistor when the capacitor unit is receiving current from the power distribution system and to reconnect it when the capacitor unit is not receiving current from the power distribution system. The invention generally comprises a capacitive element connected in parallel with a branch circuit which comprises the series connection of a normally closed switch and a discharge resistor. The switch is responsive to power frequency current flowing into the capacitive element and opens when power frequency current is flowing. This effectively removes the discharge resistor from the circuit when the power frequency current is flowing in the capacitor unit. When power frequency current ceases, the switch returns to its normally closed position, reconnecting the discharge resistor.

It should be apparent to those skilled in the art that the switch can take many forms, as long as it opens in response to the flow of power frequency current in the capacitor unit and closes when power frequency current is not flowing.

DESCRIPTION OF THE PREFERRED EMBODIMENT

Figure 1:
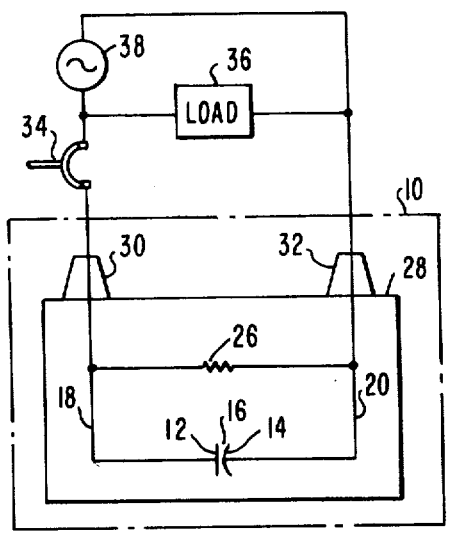
FIG. 1 shows a prior art capacitor unit with a discharge resistor permanently connected across the capacitive element.

Referring to the drawings, FIG. 1 shows a prior art capacitor unit 10, connected to a power distribution system comprising a voltage source 38 and load 36 through a circuit breaker 34. A capacitive element 16 is shown within unit 10 that comprises a dielectric material between capacitor electrodes 12 and 14. Conductive leads 18 and 20, connected respectively to electrodes 12 and 14, leave the capacitor unit enclosure 28 through insulating bushings 30 and 32. A discharge resistor 26 is permanently connected to the conductive leads 18 and 20.

Figure 2:
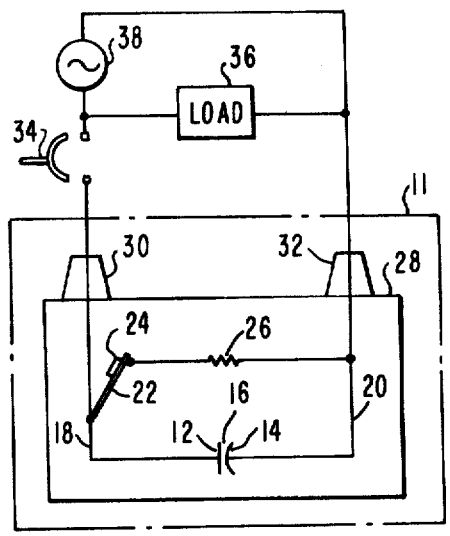
FIG. 2 shows an embodiment of the present invention with a discharge resistor switch in the closed position.

FIG. 2 shows a capacitor unit 11 in accordance with the present invention. A switch comprising spring contact 22 and ferrous metal slug 24 is included in the branch circuit containing discharge resistor 26. This figure shows the condition where power frequency current is not flowing since circuit breaker 34 is open, isolating the capacitor unit 11 from the electrical power distribution system voltage source 38 and load 36. Since power frequency current is not flowing in the capacitor unit, the switch comprising spring contact 22 and ferrous metal slug 24 is closed. Therefore, discharge resistor 26 is connected through conductive leads 18 and 20 and capacitor electrodes 12 and 14, to the capacitive element 16. Conductive leads 18 and 20 leave the enclosure 28 through bushings 30 and 32.

Figure 3:
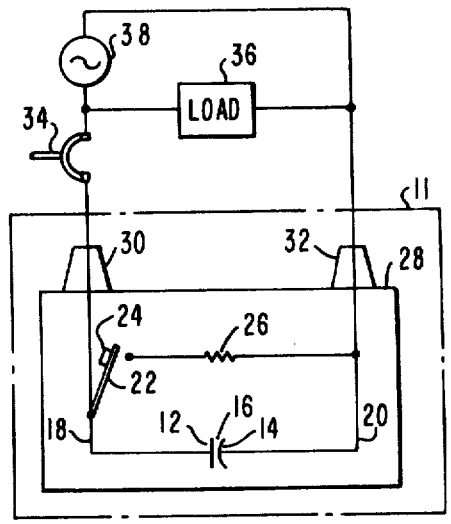
FIG. 3 shows the apparatus of FIG. 2 with the switch in the open position.

FIG. 3 shows a capacitor unit 11 in accordance with the present invention, in the condition where power frequency current is flowing into the capacitor unit since circuit breaker 34 is closed. In this figure, the switch comprising spring contact 22 and ferrous metal slug 24 is open since the ferrous metal slug has been attracted toward conductive lead 18 by the magnetic field created by the power frequency current flowing through conductive lead 18.

Figure 4:
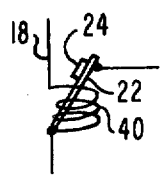
FIG. 4 schematically illustrates the magnetic operation of the switch of FIG. 2.

FIG. 4 schematically illustrates the magnetic operation of the switch of FIG. 2. Conductive lead 18 is shown as being formed into a coil 40 which concentrates the magnetic field caused by current flowing in conductive lead 18 so that sufficient force acts on ferrous metal slug 24 to overcome the spring bias of spring contact 22, thereby opening the switch when power frequency current is flowing into the capacitor unit.

Figure 5:
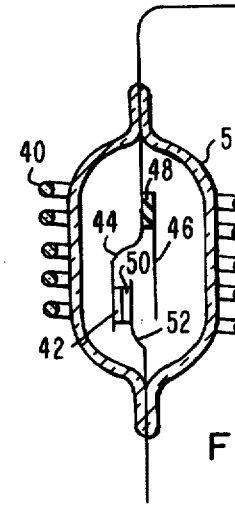
FIG. 5 shows an alternative embodiment of the switch of FIG. 2.

FIG. 5 shows a reed switch as an alternative embodiment of the switch of FIG. 2. In this embodiment, a non-ferrous electrical contact 42 is connected to a non-ferrous conductor 44. A ferrous member 46 is attached to insulator 48 which is attached to conductor 44. A second non-ferrous electrical contact 50 is connected to a ferrous spring conductor 52. An insulating envelope 54, made of material such as glass, encloses these conductors and contacts as shown. Coil 40 is wrapped around envelope 54 to create a magnetic field which causes ferrous spring conductor 52 and ferrous member 46 to attract each other, thereby opening contacts 42 and 50.

It should be apparent that other switches, such as relays, can be used without departing from the scope of the present invention, as long as they provide a pair of normally closed contacts which open in response to the flow of power frequency current in the capacitor unit.

What is claimed is:

1. A capacitor unit comprising:
   two capacitor electrodes separated by dielectric material;
   two conductive leads each electrically connected to one of said capacitor electrodes;
   a branch circuit connected between said conductive leads;
   said branch circuit including a resistor and a switch in series with said resistor; and
   said switch including means responsive to power frequency current flowing in the conductive leads for opening said circuit branch when power frequency current is flowing in the capacitor unit, and for maintaining said circuit branch closed when power frequency current is not flowing in the capacitor unit to discharge residual charge from said capacitor electrodes.

2. A capacitor unit as recited in claim 1, wherein said switch comprises:
   a movable spring biased electrical contact member which holds the switch closed when power frequency current is not flowing into the capacitor unit; and
   a ferrous metal slug attached to said electrical contact which is attracted by the magnetic field created by the power frequency current, to open said switch.

3. A capacitor unit as recited in claim 1, further comprising a coil, wherein the magnetic field created in said coil by power frequency current opens said switch.

4. A capacitor unit as recited in claim 1, wherein said switch is a magnetically operated reed switch.

5. A capacitor unit as recited in claim 1, further comprising an enclosure which contains said capacitor electrodes, said conductive leads, and said branch circuit wherein said conductive leads pass through the enclosure.

6. A capacitor operating system comprising:
   two capacitor electrodes separated by dielectric material;
   two conductive leads each electrically connected to one of said capacitor electrodes;
   a first branch circuit connected between said conductive leads;
   said first branch circuit including a resistor and a switch in series with said resistor;
   said switch including means responsive to power frequency current flowing in the conductive leads for opening said first branch circuit when power frequency current is flowing in the capacitor electrodes, and for maintaining said first branch circuit closed when power frequency current is not flowing in the capacitor electrodes, to discharge residual charge from said capacitor electrodes;
   an alternating voltage source;
   a circuit interrupting means;
   a second branch circuit connected between said conductive leads;
   said second branch circuit including the series connection of said alternating voltage source and said circuit interrupting means.

7. A capacitor operating system as recited in claim 6, wherein said switch comprises:
   a movable spring biased electrical contact member which holds the switch closed when power frequency current is not flowing in the capacitor electrodes; and
   a ferrous metal slug attached to said electrical contact member which is attracted by the magnetic field created by the power frequency current, to open said switch.

8. A capacitor operating system as recited in claim 6, further comprising a coil, wherein the magnetic field created in said coil by power frequency current opens said switch.

9. A capacitor operating system as recited in claim 6, wherein said switch is a magnetically operated reed switch.

10. A capacitor operating system as recited in claim 6, wherein said interrupting means is a circuit breaker.

* * * * *